Sept. 8, 1970  L. WEISBORD ET AL  3,527,105

FLUID PRESSURE OPERABLE ACCELEROMETER

Filed Oct. 2, 1967

INVENTORS
LEON WEISBORD
HUGH E. RIORDAN
BY
Karl A. Ohralik
ATTORNEY

United States Patent Office 3,527,105
Patented Sept. 8, 1970

3,527,105
FLUID PRESSURE OPERABLE ACCELEROMETER
Leon Weisbord, New York, N.Y., and Hugh E. Riordan, Wyckoff, N.J., assignors to Singer-General Precision, Inc., a corporation of Delaware
Filed Oct. 2, 1967, Ser. No. 672,209
Int. Cl. G01p 15/00
U.S. Cl. 73—515    5 Claims

ABSTRACT OF THE DISCLOSURE

A fluid pressure operable accelerometer is provided comprising a housing and a spool-shaped inertial mass. The inertial mass in the basic embodiment of the invention is a single spool formed by two cylindrical end sections of unequal diameter which are joined by a stem. The accelerometer housing is provided with an aperture consisting of concentrically disposed cylindrical bores which are adapted to receive the end sections of the spool to form a relatively fluid-tight cavity within the aperture between the spool end sections. When the accelerometer housing is mounted on an object with the housing aperture in alignment with the path of travel of the object and the spool is slidably disposed within the aperture, the inertia of the spool causes the spool to tend to remain at rest when the object is accelerated. The resulting relative movement between the spool and the housing is employed to pressurize the fluid-tight cavity with a fluid pressure which will exert a feedback force on the spool in the direction of the acceleration, to prevent the relative movement between the spool and the housing and thereby cause the spool to have the same acceleration as the housing. Since the acceleration of the spool is proportional to the feedback force applied to the spool and the feedback force is proportional to the fluid pressure within the cavity, the fluid pressure within the cavity is proportional to the acceleration of the housing and the object along the path of travel.

BACKGROUND OF THE INVENTION

Field of the invention

This invention relates generally to accelerometers and more particularly to a fluid pressure operable accelerometer which is particularly suited fo applications, such as guided missile control systems and the like, which require non-electric operation, extended operating range, and small size and weight.

Description of the prior art

The acceleration of an object may be defined as the change in the velocity of the object during any interval of time divided by the duration of that time interval. Since the velocity of the object can increase or decrease during the stated time interval, the term "acceleration" as used herein shall be deemed to refer to both positive acceleration and negative acceleration. In order to measure or sense acceleration, a variety of devices, such as electric strain gages and spring-restrained mechanical devices, for example, have been employed for the many applications requiring such measuring or sensing of acceleration. For certain applications, such as aircraft automatic pilots, for example, the environmental operating conditions impose very serious restrictions on the type of accelerometer which can be employed, since the accelerometer chosen for such applications must be of small size and weight and must be able to withstand the mechanical shocks and vibrations resulting from aircraft operation. With the advent of guided missiles and other vehicles operating in space, the operating restrictions imposed upon the accelerometer became much greater, with the result that many of the older types of accelerometer are no longer usable. The size and weight limitations imposed upon accelerometer construction have become much more severe in missile applications and the mechanical shock requirements have correspondingly increased. Furthermore, due to the larger accelerations encountered in missile applications, the dynamic operating range of the accelerometer must be considerably increased. A further requirement imposed in many guided missile applications is that the accelerometer be completely non-electric in operation. This requirement is dictated by the fact that the accelerometer may be called upon to operate in a control system which is subject to a nuclear radiation environment, such as that produced by a thermonumlear missile defense system, for example. In a nuclear radiation environment, the radiation involved may seriously impair or even destroy the functioning of an electrical guidance system thereby rendering the missile useless for the purpose intended. Accordingly, many prior accelerometers, such as the aforementioned electric strain gages and spring-restrained mechanical devices, for example, are completely unsuited for use in guided missile control systems. It may also be pointed out that, regardless of the application involved, a suitable accelerometer is still subject to the universal demand for a device which may be economically manufactured and maintained.

SUMMARY OF THE INVENTION

It is an object of this invention to provide a fluid pressure operable accelerometer which satisfies the aforementioned requirements of small size and weight, non-electric operation, extended dynamic operating range and mechanical ruggedness imposed by applications such as guided missile control systems and the like, and which is accordingly suited for use in such applications.

It is a further object of this invention to provide a fluid pressure operable accelerometer which exhibits an exellent bandpass characteristic and an extremely linear relationship between acceleration being sensed and pressure output, the said linear relationship being unaffected by variations in the fluid pressure applied to the device, the flow characteristics of the supply and exhaust ports for the device, and the choice of a gas or a liquid as the fluid employed in the device.

It is a still further object of this invention to provide a fluid pressure operable accelerometer which is capable of sensing acceleration of an object in either direction along a given path of travel and which is unaffected by variations in ambient pressure.

It is an additional object of this invention to provide a fluid pressure operable accelerometer which consists of a very small number of operating parts and which is correspondingly economical to manufacture and maintain.

Briefly, the fluid pressure operable accelerometer of the invention comprises a housing and an inertial mass disposed in an aperture formed in the housing for sliding movement therealong. The housing is adapted to be mounted on an object, the acceleration of which is to be sensed, with the housing aperture in alignment with the path of travel of the object, so that acceleration of the housing in a direction along the path of travel produces a relative movement between the inertial mass and the housing. Variable fluid pressure means controlled by the relative movement between the inertial mass and the housing are provided to exert a feedback force on the inertial mass in the direction of the acceleration being sensed, to prevent the relative movement and to cause the inertial mass to have the same acceleration as the housing, whereby the fluid pressure developed by the variable fluid pressure means in producing the required feedback force is proportional to the acceleration of the housing and the object upon which the housing is mounted. When the acceleration being sensed is only in one direction along the path of travel of the object, the inertial mass may comprise a single spool having first and second cylindrical end portions of unequal diameter which are joined by a stem. The housing aperture may then comprise two concentrically disposed cylindrical bores which receive the end portions of the spool to form a fluid-tight cavity in the aperture between the end portions.

The spool is so disposed in the housing aperture that the diameters of the end portions increase in the direction of the acceleration being sensed, so that when the cavity formed by the spool and housing is pressurized with a fluid pressure, the required feedback force will be applied to the spool in that direction. In the single spool embodiment of the invention, the variable fluid pressure means may comprise a single supply port and a single exhaust port disposed in the housing walls in communication with the cavity. The supply port is adapted to be coupled to a fluid pressure supply source, such as a pressurized tank or a pump, and forms an opening in the smaller diameter cylindrical bore of the housing. This opening and the smaller diameter end portion of the spool function as a valve to control the fluid pressure applied to the cavity in response to the relative movement between the housing and the spool. The pressure at the exhaust port is then proportional to the acceleration being sensed. When acceleration is to be sensed in two directions along the path of travel, the inertial mass may comprise a double spool having two end portions of equal diameter and a central portion of larger diameter joined to the end portions by stem means. Each of the two fluid-tight cavities formed in this embodiment of the invention is pressurized by a separate supply port and a separate exhaust port is provided for each cavity to sense the fluid pressure therein. The two end portions of the double spool are so spaced with respect to the openings formed by the two supply ports, that equal reference pressures appear at the two exhaust ports when the accelerometer is subject to no acceleration, so that upon acceleration of the housing in either direction, the magnitude and sense of the pressure differential appearing between the output pressures at the exhaust ports respectively represent the magnitude and direction of the acceleration being sensed.

The nature of the invention and other objects and additional advantages thereof will be more readily understood by those skilled in the art after consideration of the following detailed description taken in conjunction with the accompanying drawing.

DESCRIPTION OF THE PREFERRED EMBODIMENT OF THE INVENTION

Figure 1:
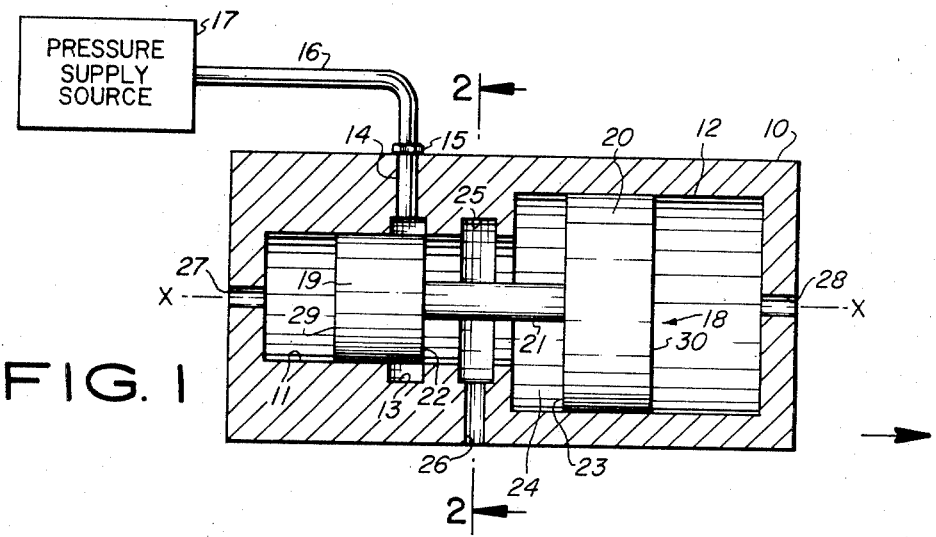
FIG. 1 is a full sectional view of a fluid pressure operable accelerometer constructed in accordance with the teachings of the present invention which is capable of sensing acceleration in a single direction.
Figure 2:
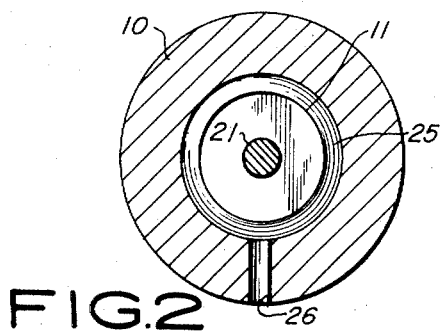
FIG. 2 is a full sectional view of the accelerometer of FIG. 1 taken along the line 2—2 of FIG. 1 of the drawing.

Referring now to FIGS. 1 and 2 of the drawing, there is shown a fluid pressure operable accelerometer constructed in accordance with the teachings of the present invention comprising a cylindrical housing 10 which is adapted to be mounted on a missile or other object by any convenient means, such a mounting screws, for example, not shown. The cylindrical housing 10 is provided with an aperture consisting of a first cylindrical bore 11 and a second cylindrical bore 12 of larger diameter which is concentrically disposed with respect to the first bore about the operating axis X—X of the accelerometer. An annular groove 13 is formed in the housing 10 about the periphery of the smaller bore 11 and communicates with a supply passageway 14 which is coupled by means of a fitting 15 and a pipe 16 to a fluid pressure supply source 17. As will be explained more fully hereinafter, the pressure supply source 17 may comprise a pressurized tank or "bottle" or take the form of a pump for a liquid or gaseous fluid medium.

An inertial mass, indicated generally as 18, is disposed in the housing aperture formed by bores 11 and 12 and is arranged for sliding movement therealong. The inertial mass 18 in this embodiment of the invention is a cylindrical "spool" having a cylindrical end portion 19 which is slidably disposed in the bore 11 and a larger diameter cylindrical end portion 20 which is slidably disposed in the bore 12. The end portions 19 and 20 of the spool are joined by a rod or stem 21 so that the spool moves as a single, integral element along the axis X—X of the housing 10. In practice, the diameters of the housing bores 11 and 12 and the spool ends 19 and 20 may be so dimensioned as to provide a sliding fit which will facilitate the axial movement of the inertial mass along the axis X—X. Additionally, it may be noted that any fluid leakage which may occur between the ends 19 and 20 of the spool and the cylindrical walls of the housing will act as a lubricant in the manner of a gas bearing to further facilitate this axial movement. In this regard, it may also be noted that the inner surface 22 of the smaller end portion 19 of the spool and the inner surface 23 of the larger end portion 20 of the spool form with the cylindrical walls of the housing a relatively fluid-tight cavity 24. The cavity 24 is provided with an annular groove 25 which lies between the spool ends 19 and 20 and connects with a passageway or exhaust port 26 which serves to connect the cavity with the exterior of the housing. The exhaust port 26 is adapted to be coupled by a suitable fitting, not shown, to a pressure responsive indicator or control device which is intended to be operated by the acceleration being sensed. In order to permit free axial movement of the spool 18 along the axis X—X of the housing, vents 27 and 28 are located in the end walls of the cylindrical housing. Vent 27 functions to exhaust any pressure built up in the bore 11 as the outer surface 29 of the smaller end 19 of the spool moves to the left along the X—X axis shown in FIG. 1 of the drawing, while vent 28 functions to eliminate any pressure built up in the bore 12 by the outer surface 30 of the larger end 20 of the spool as the spool moves to the right along the X—X axis.

By virtue of the foregoing arrangement, a "closed-loop" or feedback operation is provided in the accelerometer of the invention. When the object upon which the housing 10 is mounted accelerates in the direction of the arrow shown in FIG. 1 of the drawing, the inertial mass 18 will tend to remain at rest in accordance with Newton's First Law of Motion, so that a relative movement is produced between the inertial mass and the housing. This relative movement is utilized to control variable fluid pressure means formed by the pressure supply passageway 14, annular groove 13 and the smaller diameter end portion 19 of the spool. Since relative movement between the spool and the housing causes the end portion 19 of the spool to vary the size of the opening formed by annular groove 13 into the cavity 24, the position of the spool with respect to the housing determines the magnitude of the fluid pressure applied to cavity 24 from the pressure supply source 17. When the cavity is pressurized with a fluid pressure exceeding the ambient pressure, the spool 18 will move in the direction of the arrow shown in FIG. 1 of the drawing because the area of the inner surface 23 of spool end 20 is greater than the area of the inner surface 22 of spool end 19. Accordingly, the force exerted on the spool 18 by the variable fluid pressure means is in the direction of the acceleration being sensed and is a feedback force which tends to prevent the relative movement between the spool and housing which gave rise to the force. When the accelerometer is not subject to any acceleration, this force will cause the spool to move in the direction of the arrow shown in FIG. 1 of the drawing until the annular groove 13 is closed by the end portion 19 of the spool, at which time the device is at rest.

Figure 3:
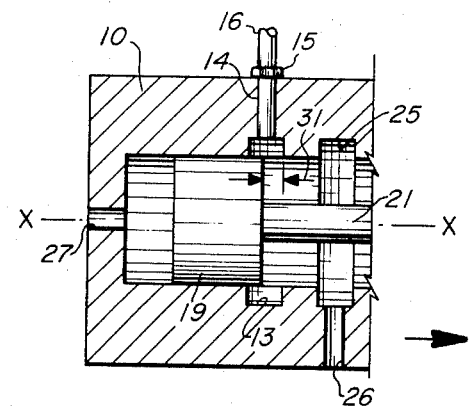
FIG. 3 is a foreshortened full sectional view of the accelerometer of FIGS. 1 and 2 of the drawing showing the relative positions of the inertial mass and the housing of the accelerometer when the accelerometer is subject to acceleration in the direction of the arrow shown in FIG. 3.

A complete cycle of operation may be demonstrated by reference to FIGS. 1 and 3 of the drawing. As shown in FIG. 3 of the drawing, as the object upon which the accelerometer is mounted moves along the X—X axis in the direction of the arrow, the housing 10 will advance a small distance with respect to the inertial mass 18, so that the annular groove 13 is no longer closed by the smaller end 19 of the spool, but is instead opened a distance indicated by the reference character 31. At this time, the pressure from the fluid pressure supply source 17 will enter the cavity 24 between the spool ends and will pressurize the cavity. Since the inner surface 23 of the larger spool end 20 has a larger surface area than the inner surface 22 of the smaller spool end 19, the pressure within the cavity 24 will tend to cause the spool to move in the direction of the arrows shown in FIGS. 1 and 3 of the drawing to counterbalance the sliding movement of the spool caused by the acceleration of the housing. When the fluid pressure within the cavity is built up to a point where it produces a feedback force on the spool which prevents any further sliding movement of the spool with respect to the housing, the inertial mass will reach a stable operating point with no further motion and the magnitude of the pressure appearing at the outlet port 26 will be proportional to the acceleration experienced by the housing. When the applied acceleration drops to zero, the fluid pressure within the cavity 24 will cause the spool 18 to move in the direction of the arrow and close annular groove 13, thereby restoring the device to the stable operating condition shown in FIG. 1 of the drawing. This cycle of operation is repeated for each succeeding acceleration to which the accelerometer is subjected.

The foregoing operation of the fluid pressure operable accelerometer of the invention may be expressed mathematically in the following manner. As the housing 10 accelerates in the direction of the arrow shown in FIGS. 1 and 3 of the drawing, the inertia of the spool 18 tends to cause the spool to remain at rest, thereby producing a small relative movement between the housing and the spool. In order to eliminate this relative movement, it is necessary to apply a force to the spool which will cause the spool to have the same acceleration as the housing. This force is given by the basic equation (1) $$F = ma$$

Where F is the force applied to the spool, $m$ is the mass of the spool and $a$ is the desired acceleration of the spool which is to be made equal to the acceleration of the housing. Since the variable fluid pressure means formed by the annular groove 13 and the smaller end 19 of the spool will pressurize the cavity 24 with a pressure that is proportional to the displacement between the housing and the spool, a force will be applied to the spool in the direction of the arrow shown in FIGS. 1 and 3 of the drawing and the relative movement between the housing and the spool will be reduced to zero. The magnitude of the force produced by the variable pressure means is given by the expression (2) $$F = P_0(A_2 - A_1) - P_A(B_2 - B_1)$$

where $P_0$ is the pressure at exhaust port 26, $P_A$ is the ambient pressure, $A_2$ is the area of the inner surface 23 of the larger spool end 20, $A_1$ is the area of the inner surface 22 of the smaller spool end 19, $B_2$ is the area of the outer surface 30 of the larger spool end, and $B_1$ is the area of the outer surface 29 of the smaller spool end. When the spool ends are cylindrical, the outer surface areas $B_1$ and $B_2$ may be represented as (3) $$B_1 = A_1 + A_s$$

and (4) $$B_2 = A_2 + A_s$$

where $A_s$ is the cross-sectional area of the spool stem 21. Accordingly, (5) $$B_2 - B_1 = A_2 - A_1$$

Substituting Equation 5 in Equation 2, the force F is then given by the expression (6) $$F = \Delta A (P_0 - P_A)$$

where $\Delta A = A_2 - A_1$. When Equation 6 is substituted for F in Equation 1 and Equation 1 is solved for the acceleration $a$, the acceleration of the housing is given by the expression (7) $$a = \frac{\Delta A}{m}(P_0 - P_A)$$

From the foregoing mathematical analysis, it is believed apparent that the magnitude of the pressure $P_0$ appearing at exhaust port 26 is proportional to the acceleration of the housing and consequently to the acceleration of the object to which the housing is affixed. It may be noted from the form of Equation 7 that the pressure output is linear with respect to the acceleration over the entire dynamic range of the device and that the dynamic range of the accelerometer is only limited by the maximum pressure available from the fluid pressure supply source which is utilized. In practice, the maximum pressure available from the fluid pressure supply source may be about 25% greater than the pressure required to counterbalance the maximum acceleration to be sensed by the device. It may also be noted that the pressure output $P_0$ which represents the acceleration is independent of variations in the pressure supplied from the pressure supply source 17, so that a closely regulated supply source is not required. Accordingly, the pressure supply source may take any one of a number of forms depending upon the use to which the accelerometer is put. For example, in guided missile applications where the operating life of the accelerometer will be of relatively short duration, the pressure supply source 17 may be a pressurized tank or "bottle" of the fluid medium employed. In an application of this type, the drain on the fluid pressure supply source will be small and will be essentially limited only to those periods when the missile is accelerating. When the missile has reached a constant operating speed, or is decelerating, the annular ring 13 wil be sealed by the smaller end 19 of the inertial mass 18 so that only a very small leakage, if any, will result. For applications where weight is not at a premium and a long operating life is esential, the fluid pressure supply source 17 may take the form of a pump and the vents 27 and 28 in the housing 10 may be utilized as the sump return of the pump.

The accelerometer of the invention may be fabricated of any suitable materials, such as aluminum or plastic, for example, which are capable of withstanding the maximum pressures anticipated in the operation of the device and which do not chemically react with the fluid from the pressure supply source 17. By suitably proportioning the weight of the inertial mass or spool 18 and the surface areas of the end portions 19 and 20 of the spool, the bandpass characteristic of the accelerometer may be adjusted to the width desired for a particular application. It may also be noted from the form of Equation 7 that the operational characteristics of the accelerometer are independent of whether the fluid medium employed is a gas or a liquid and are also independent of the fluid flow characteristics of the supply and exhaust ports. The foregoing advantages coupled with the obvious simplicity of construction of the device, involving as it does only two basic operating parts, clearly demonstrates that the device is economical to manufacture and maintain. If desired, the exhaust port 26 of the accelerometer may be coupled directly to a pressure gage which is calibrated in units of acceleration or the output pressure may be utilized in a fluid pressure operable control system.

Figure 4:
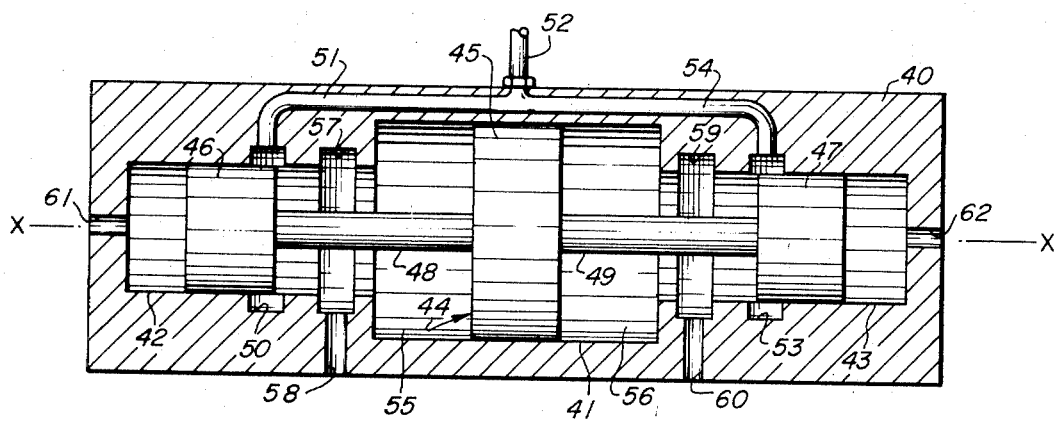
FIG. 4 is a full sectional view of a fluid pressure operable accelerometer constructed in accordance with the teachings of the present invention which is capable of sensing acceleration in two directions.

The accelerometer illustrated in FIGS. 1, 2 and 3 of the drawing, is capable of sensing acceleration in only one direction along a given path of travel. In FIG. 1, for example, the accelerometer can sense positive acceleration (increases in velocity) for an object traveling along the X—X axis in the direction of the arrow but cannot sense negative acceleration (decreases in velocity) in that direction. Similarly, the accelerometer of FIG. 1 can sense negative acceleration but not positive acceleration for objects traveling along the X—X axis in the opposite direction. In the embodiment of the invention shown in FIG. 4 of the drawing; however, the accelerometer shown is capable of sensing both positive and negative acceleration for objects traveling in either direction along the X—X axis illustrated. As seen in FIG. 4, the accelerometer comprises a cylindrical housing 40 which is provided with a large diameter, centrally located bore 41 and two smaller diameter bores 42 and 43 which are concentrically disposed with respect to the larger bore along the X—X axis of the accelerometer. The smaller bores 42 and 43 may conveniently have equal diameters. An inertial mass indicated generally by the reference character 44 comprises a double spool arrangement having a central cylindrical portion 45 of large diameter which is disposed in the large diameter bore 41 of the housing, a smaller diameter cylindrical end portion 46 which is disposed in the smaller diameter bore 42, and a cylindrical end portion 47 having the same diameter as end portion 46 which is disposed in the cylindrical bore 43 of the housing. The central portion 45 of the spool 44 is joined to the end portions of the spool by stems 48 and 49, to thereby provide an integral unit which is slidable disposed within the aperture of housing 40 along the X—X axis. Again, as in the embodiment of the invention shown in FIGS. 1, 2 and 3 of the drawing, the inertial mass 44 may be so proportioned as to provide sliding fit with respect to the cylindrical bores of the housing 40. The smaller diameter end portion 46 of the double spool is arranged to control a pressure supply port for the left end of the accelerometer which comprises an annular groove 50 formed in cylindrical bore 42 of the housing and a passageway 51 which communicates with a pressure supply source pipe 52. Similarly, an annular groove 53 and a communicating passageway 54 are provided for the cylindrical bore 43 of the housing to form a pressure supply port for the right end of the accelerometer as shown in FIG. 4. This pressure supply port is controlled by the end portion 47 of the double spool. Both supply ports are fed by a common pipe 52 which may be coupled to a single fluid pressure supply source, not shown.

A fluid-tight cavity 55 is formed in the left end of the housing by the large diameter central portion 45 of the spool and the small diameter end portion 46 of the spool, while a similar cavity 56 is formed in the right end of the housing by the central portion 45 of the spool and the end portion 47. The cavity 55 is coupled to the exterior of the housing by an annular groove 57 and a communicating passageway 58 to form a first exhaust port, while cavity 56 is similarly coupled to the exterior of the housing by an annular groove 59 and a passageway 60 to form a second exhaust port. Again, as in the embodiment of the invention shown in FIGS. 1, 2 and 3, the outer ends of the cylindrical bores 42 and 43 of the housing are respectively vented by vents 61 and 62 to prevent a pressure build up in either end of the housing upon movement of the inertial mass in either direction along the X—X axis of the accelerometer. The embodiment of the invention shown in FIG. 4 of the drawing, functions in substantially the same manner as the embodiment shown in FIGS. 1, 2 and 3 of the drawing, except, as will be demonstrated mathematically hereinafter, the operation of the embodiment of FIG. 4 will be independent of variations in ambient pressure. It may be noted at this time that it is preferable to so proportion the spacing between the inner surfaces of the end portions 46 and 47 of the inertial spool 44 that a small trickle of fluid is allowed to pass through both of the supply ports formed by annular grooves 50 and 53 when the accelerometer is not subject to any acceleration. This will permit the accelerometer shown in FIG. 4 to operate in the manner of a pressure differential device wherein the differential in output pressures of the exhaust ports 58 and 60 is proportional to acceleration in either direction along the X—X axis of the device. When the housing 40 and the object to which it is affixed are not accelerating in either direction along the X—X axis, the fluid pressure in passageways 51 and 54 and annular grooves 50 and 53 will pressurize the cavities 55 and 56 with the same fluid pressure and if the two end portions of the spool possess equal inner surface areas, the spool will be at rest and will be centrally disposed with respect to the two supply ports. It may be noted that only a small fluid pressure drain from the pressure supply source is needed to accomplish this result. At this time, the output or reference pressures appearing at exhaust ports 58 and 60 will be of equal magnitude, thereby indicating the absence of acceleration in either direction along the X—X axis.

When the accelerometer housing 40 is accelerated to the right along the X—X axis shown in FIG. 4 of the drawing, the supply port formed by annular groove 50 will open and admit more pressure to the cavity 55, thereby increasing the output pressure at exhaust port 58. The fluid pressure in cavity 55 will increase until a feedback force of sufficient magnitude to prevent relative movement between the spool and housing is attained. At the same time, the same relative movement between the housing 40 and the inertial mass 44 will tend to close the supply port formed by annular groove 53, to thereby decrease the pressure in cavity 56 and consequently decrease the output pressure at exhaust port 60. The magnitude of the pressure differential between the outputs of exhaust ports 58 and 60 will then be proportional to the magnitude of the acceleration experienced by the housing. As the acceleration diminishes to zero the pressure applied through supply port 50 will return the inertial mass 44 to its centrally located position between the supply ports and the pressure appearing at exhaust port 58 will be equal to the pressure appearing at exhaust port 60. When the accelerometer housing 40 is accelerated to the left along the X—X axis shown in FIG. 4 of the drawing, the relative movement between the housing 40 and the inertial mass 44 will increase the opening of the supply port formed by annular groove 53 and will thereby increase the pressure applied to cavity 56 and cause the output pressure at exhaust port 60 to increase. Again, the cavity pressure will be that pressure needed to exert the required feedback force on the inertial mass to prevent further relative movement between the mass and the housing. At the same time, the pressure applied to cavity 55 from the supply port formed by annular groove 50 will decrease, thereby decreasing the pressure output at exhaust port 58. The magnitude of the pressure differential between the two exhaust port outputs will then be proportional to the magnitude of the acceleration experienced by the housing. Since the relative magnitudes of the pressures appearing at exhaust ports 58 and 60 will increase in one sense for acceleration in one direction along the X—X axis and will increase in the opposite sense for acceleration in the other direction, the pressure differential appearing at the exhaust ports will indicate by its magnitude and sense the magnitude and direction of the acceleration experienced by the housing. Accordingly, the embodiment of the invention shown in FIG. 4 of the drawing is capable of providing a differential output which will indicate both the magnitude and the direction of the acceleration experienced by the object to which the accelerometer is affixed.

The operation of the embodiment of the invention shown in FIG. 4 of the drawing may be demonstrated mathematically in the following manner. Assuming initially that the housing 40 of the accelerometer is accelerated to the right along the X—X axis, the feedback force F which must be applied to the spool 44 to cause the spool to have the same acceleration as the housing is again given by the expression (8) $$F = ma$$

where $m$ is the mass of spool 44 and $a$ is the acceleration to be sensed. The force F applied to the spool 44 by the variable fluid pressure means may be expressed as (9) $$F = P_{01}(A_2 - A_1) - P_{02}(A_2 - A_1) = P_A B - P_A B$$

where $P_{01}$ is the pressure at exhaust port 58, $P_{02}$ is the pressure at exhaust port 60, $P_A$ is the ambient pressure, $A_1$ is the area of the inner surface of each of the cylindrical end portions 46 and 47 of the spool, $A_2$ is the area of the surface of the central portion 45 of the spool, and B is the area of the outer surface of each of the end portions 46 and 47 of the spool. This equation reduces to

(10) $$F = \Delta A (P_{01} - P_{02})$$

where $\Delta A = (A_2 - A_1)$, it being noted that the two terms containing the ambient pressure $P_A$ cancel out. When Equation 10 is substituted in Equation 8 and the resulting equation solved for the acceleration, the acceleration is given by the expression

(11) $$a = \Delta A / m (P_{01} - P_{02})$$

From the foregoing mathematical analysis, it is believed apparent that the accelerometer shown in FIG. 4 of the drawing operates independently of ambient pressure and is therefore preferred for some applications over the embodiment shown in FIGS. 1, 2 and 3 of the drawing. From the form of Equation 11 it is also believed to be apparent that the magnitude of the differential output pressure $(P_{01} - P_{02})$ is strictly proportional to the magnitude of the acceleration being sensed and that the sense or sign of this term represents the direction of the acceleration being sensed. In all other respects, the embodiment of the invention shown in FIG. 4 of the drawing, possesses the inherent advantages of the accelerometer of FIGS. 1, 2 and 3 of the drawing. If desired, the exhaust ports 58 and 60 of the accelerometer may be coupled to a suitable fluid pressure operable differential amplifier to provide an all fluid operable system for controlling the flight of a guided missile or may be directly applied to instrumentation or other suitable navigational equipment.

The fluid pressure operable accelerometer of the invention is completely non-electric in operation and is therefore suitable for use in applications, such as guided missile control systems and the like, for example, which require such non-electric operation. Furthermore, the simplicity of construction of the accelerometer of the invention does not serve to compromise its accuracy in any way and the device has a dynamic range of operation which is only limited by the maximum supply pressure available for the device.

It is believed apparent that many changes could be made in the construction and described uses of the foregoing fluid pressure operable accelerometer and many seemingly different embodiments of the invention could be constructed without departing from the scope thereof. For example, it is believed obvious that the inertial mass and housing of the accelerometer could take a variety of other forms which would be capable of producing the same basic operation. Accordingly, it is intended that all matter contained in the above description or shown in the accompanying drawing, shall be interpreted as illustrative and not in a limiting sense.

What is claimed is:

1. A fluid pressure operable accelerometer comprising:
a housing having an axis,
a plurality of differentially sized apertures disposed within said housing in coaxial relation to said axis, said apertures comprising first and second apertures of equal diameter and a centrally disposed aperture of larger diameter all of said apertures axially communicating with each other respectively,
a double spool-shaped inertial mass disposed within said housing having first and second radially enlarged axial end portions corresponding to said first and second apertures and a radially enlarged center portion corresponding to said centrally disposed aperture whereby said end portions and said center portion are adapted to be axially displaceable within said corresponding apertures respectively,
said first and second end portions and said enlarged center portion defining a pair of axially opposed fluid-tight cavities for bridging said first aperture and said centrally disposed aperture and said second aperture and said centrally disposed aperture respectively, and
a pair of fluid pressure inlet means communicating respectively with each said first and second apertures and cooperating with said first and second end portions respectively for supplying fluid under equal pressures to each one of said opposed cavities when said double spool-shaped proof mass is in a null position, said pair of fluid pressure inlet means being further responsive to the axial displacement of said proof mass by an acceleration force being applied along said axis to supply fluid under increasing pressure to one of said opposed cavities and to supply fluid under decreasing pressure to the other of said opposed cavities, whereby the resulting differential pressures in said opposed cavities are representative of the magnitude and direction of acceleration being applied along said axis as hereinbefore said.

2. A fluid pressure operable accelerometer as claimed in claim 1 wherein said first and second radially enlarged end portions comprise respectively a pair of cylindrical portions and said center portion comprises a cylindrical portion of greater diameter than either of said first and second cylindrical portions and wherein said corresponding apertures comprise coaxially disposed cylindrical bores having diameters substantially corresponding to the diameters of said cylindrical portions of said double spool-shaped means, and the bore spaces between said first cylindrical end portion and said center cylindrical portion and between said second cylindrical end portion and said center cylindrical portion of the double spool-shaped means respectively comprise said pair of cavities.

3. A fluid pressure operable accelerometer as claimed in claim 2, wherein each said variable fluid pressure means comprises supply port means and further includes exhaust port means disposed in the wall of said housing in communication with each said bore space, said supply port means being adapted to be coupled to a fluid pressure supply source and forming an opening in the cylindrical bore of smaller diameter adjacent the smaller diameter end portion of said double spool-shaped means, whereby said opening and said smaller diameter end portion of the spool-shaped means function as a valve operable by sliding movement of the spool-shaped means along said aperture to control the magnitude of the fluid pressure applied to each said bore space.

4. A fluid pressure operable accelerometer as claimed in claim 3, wherein the said opening formed by each supply port means is an annular groove disposed about the periphery of the smaller diameter bore space of the housing.

5. A fluid pressure operable accelerometer as claimed in claim 3, wherein said first and second supply ports are adapted to be coupled to a single fluid pressure supply source and said first and second end portions of the double spool are so spaced with respect to the openings formed by said first and second supply ports that reference pressures of equal magnitude appear at said first and second exhaust ports when the accelerometer is subject to no acceleration, whereby the magnitude and sense of a pressure differential appearing between the pressures at said first and second exhaust ports upon acceleration respectively represent the magnitude and direction of the acceleration being sensed.

References Cited

UNITED STATES PATENTS

| | | | |
|---|---|---|---|
| 2,939,470 | 6/1960 | Kohr | 73—515 |
| 2,951,694 | 9/1960 | Scheiter | 73—521 |
| 3,147,625 | 9/1964 | Green | 73—515 |
| 3,263,505 | 8/1966 | Grunwald | 73—515 |
| 3,315,531 | 4/1967 | Grimland | 73—515 |

JAMES J. GILL, Primary Examiner

H. GOLDSTEIN, Assistant Examiner